United States Patent Office 3,181,962
Patented May 4, 1965

3,181,962
CONVERSION OF NON-LEAFING TO LEAFING METALLIC PIGMENTS
Rolf Rolles, Allegheny Township, Westmoreland County, Pa., assignor to Aluminum Company of America, Pittsburgh, Pa., a corporation of Pennsylvania
No Drawing. Filed Mar. 1, 1962, Ser. No. 176,763
5 Claims. (Cl. 106—290)

This invention relates in general to improved methods for the production of metallic pigments suitable for incorporation in metallic paints, inks, and coating formulations, and is more particularly concerned with the processing of aluminum flake pigments in their conversion from non-leafing to leafing grade materials.

It is the primary object of the invention to provide a relatively inexpensive method or methods for converting regularly and conventionally manufactured non-leafing metallic pigments to commercially acceptable leafing grade metallic pigments.

The invention is notably concerned with metallic aluminum base pigments and is hereafter described in detail in respect thereto. However, it should not be limited in its scope or practice to aluminum, since other metallic and metallic alloy pigments, the powder or particles of which are of lamellar flake type or grade, will respond with equally good success and results to provide improved commercial products in accordance with the practice of the invention.

Metallic pigments are generally produced in wet or dry form. The process described in United States Patent 2,002,891, issued May 23, 1935, to Everett J. Hall, is one which has received wide acceptance, and is generally and commercially termed a wet process in that comminution of a metallic pigment is carried out in a ball mill in a solution of a lubricant, such as a leaf-producing or non-leaf producing agent or lubricant, and a volatilizable hydrocarbon solvent, to produce a sludge-like mass or paste characterized by the individual metal particles being of relatively thin flake configuration coated with an adherent thin film of grease lubricant (leafing or non-leafing), depending on whether a leafing or non-leafing metallic pigment is desired.

The metallic sludge discharged from such a ball-milling operation is normally filtered to remove a portion of its liquid phase and to provide a metallic flake pigment cake of approximately 80 percent lubricant-coated metal flake and the balance mineral spirits containing small amounts of dissolved lubricant. Present commercial practice entails adjustment of the filter cake discharged from the ball mill by addition thereto of clean mineral spirits, or other equivalent volatilizable hydrocarbon solvent, and a fresh quantity of the particular type of lubricant (leafing or non-leafing) employed in the initial ball-milling operation to an approximate commercial marketable metallic flake pigment paste consisting of a metal content by weight of 50 to 65 percent, although the precise composition may be varied in the commercial paste so produced.

The metallic paste pigments made in accordance with the above description may be thermally treated, preferably under vacuum, to remove the volatilizable hydrocarbon solvent content thereof to produce dry metallic pigments, the flakes of which retain their adherent coating of leafing or non-leafing grease or lubricating agent.

As distinguished from the wet ball mill practice described above, a dry-milling process is also commercially employed in the production of both leafing and non-leafing metallic flake pigments. Therein small particles of metal or metallic alloys are subjected to disintegration under hammering instrumentalities in a substantially dry condition in the presence of a small quantity of a selected leafing or non-leafing grease lubricant, depending on whether a leafing or non-leafing grade of dry metallic pigment is desired. A fine grade of metallic flake pigment is produced by this dry process, a leafing grade pigment so produced being customarily additionally polished in a dry state in the presence of added leafing agent or agents in a brush type polisher.

The lubricants employed in the above-described processes, and classifiable as leafing and non-leafing types, comprise the aliphatic fatty acids. In the case of a leafing end product, i.e. a flake metallic pigment in which the individual metallic flakes are coated with an adherent relatively thin film of a leafing lubricant or agent, the lubricant is preferably selected from at least one of the straight chain higher saturated aliphatic acids selected from the group consisting of stearic, palmitic, 12-hydroxystearic and behenic acids in total amount within the range 1 to 7 percent by weight of the metallic pigment. For non-leafing pigment products, the lubricant is preferably selected from at least one of the unsaturated aliphatic fatty acids selected from the group consisting of lauric, oleic, linoleic and ricinoleic acids, and/or at least one of the lower saturated aliphatic acids of the group consisting of lauric, capric and caprylic acids, the non-leafing agent being preferably present on the metallic flakes in total amount within the range .4 to 3 percent by weight of the metallic pigment.

I have discovered that metallic flake pigments initially exhibiting non-leafing properties, in that the individual metal particles of lamellar leaf form are characterized by an adherent film coating of a non-leafing lubricant or agent, can be converted or transferred to a leafing grade metallic flake pigment by an inexpensive method which apparently includes complete or partial substitution of a leafing grade film coating or lubricant on the metal flakes for the non-leafing coating film initially thereon, without in any way destroying the desirable flake form or other inherent characteristics of the initial flake-like metallic pigment particles. I have further discovered that the method or methods of the invention can be carried out in a simple and inexpensive apparatus, and without subjecting the initial non-leafing metallic flake pigments to a separate stripping action to remove or chemically convert the non-leafing, adherent lubricant on the starting product.

The invention broadly comprises the steps of heating to above room temperature a slurry of a non-leafing metallic flake pigment in the presence of a solution of a leafing agent or grease lubricant in a volatilizable hydrocarbon solvent, the elevated temperature being maintained for a sufficient length of time to cause the leafing agent in solution to replace at least in substantial part the initially present non-leafing film on the metallic flake particles. The slurry is then cooled to room temperature and filtered, which serves to produce a filtrate containing a substantial amount of the initial non-leafing lubricant from the starting material, the added volatilizable hydrocarbon solvent or solvents, and an end product of leafing grade metallic flake pigment.

A specific performance trial of the invention was carried out by selecting 30 parts by weight of an adjusted wet ball mill-produced non-leafing aluminum paste pigment, comprising by weight 64 percent metal flake, 1 percent oleic acid distributed on the metal flake particles and 35 percent hydrocarbon solvent, and mixing the same in 170 parts hydrocarbon solvent in which 3 parts by weight of stearic acid had been dissolved. The slurry was heated to 170° C. and held at this temperature for 10 minutes, after which it was allowed to cool to room temperature.

The cooled slurry was thereafter filtered and the pigment left on the filter was determined to be a leafing grade aluminum flake pigment, whereas the filtrate analyzed to be a solution of hydrocarbon solvent containing a substantial quantity of the non-leafing oleic acid initially present on the metallic flakes.

Leaf determinations in accordance with the established practice described on pages 28–31 of the text authored by Junius D. Edwards and Robert I. Wray, third edition, copyright 1955, entitled Aluminum Paint and Powders, and dispersal of the converted non-leafing to leafing aluminum flake pigment thus produced in an oil type varnish, compared favorably with regularly and commercially initially manufactured and marketed leafing grade aluminum flake pigments. In fact, the converted pigments so produced have revealed higher values in specular gloss with slightly lower total reflectivity than leafing aluminum pigments initially manufactured as such.

Another specific performance trial of the invention consisted in formulating a slurry of 20 parts by weight dry aluminum flake pigment, the flake particles of which were coated during manufacture with non-leafing oleic acid, in 170 parts by weight hydrocarbon solvent in which 3 parts by weight stearic acid leafing agent had been dissolved. The slurry was heated to 170° C. and held at this temperature for 10 minutes.

The slurry was thereafter cooled to room temperature and filtered to produce a leafing grade aluminum flake pigment and a filtrate consisting substantially of oleic acid in solution in hydrocarbon solvent.

The resultant converted leafing product, examined for leafing property and dispersability in varnish, as described for the previous specific performance trial of the invention, was equally as good as the converted leafing aluminum flake pigment of the previously described test.

A further specific performance test of the invention entailed formulating a slurry comprising 40 parts by weight aluminum flake pigment, the individual flakes of which were characterized by an adherent relatively thin coating of non-leafing lauric acid, in admixture at room temperature with 160 parts by weight hydrocarbon solvent in which 2.5 parts by weight stearic acid had been dissolved. The slurry thus formulated was elevated in temperature to 160° C. and held for 10 minutes at that temperature.

After cooling the slurry to room temperature, the volatile hydrocarbon solvent and residual non-leafing lauric acid component were filtered off leaving a metallic aluminum pigment cake which was force dried for thirty minutes at 80° C. to provide a commercially acceptable leafing aluminum pigment in dry powdered flake form.

Practical industrial application of the invention has been established in the aluminum pigment field for converting initially manufactured or fabricated non-leafing dry and paste aluminum pigments within the composition ranges by weight 40 to 80 percent metal flakes and .35 to 3.5 percent non-leafing agents, based on metal weight, to leafing dry and paste aluminum flake pigments within the composition ranges by weight 40 to 80 percent aluminum flakes and 1 to 7 percent leafing agents, based on metal weight.

The volatile hydrocarbon solvents found to be practicable in the practice of the invention are representative of the commercially available petroleum thinners, such as mineral spirits, high flash naphtha, xylol, toluol and varnish-makers' and painters' naphtha. It has also been found to be a preferred practice of the invention to control the heating step performed on the non-leafing aluminum pigment slurries to within the temperature range of 60 to 180° C., and preferably not appreciably above the boiling point of the particular volatile hydrocarbon solvent, or mixtures thereof, employed in formulating the slurries, to avoid destroying the leaf-imparting properties of the replacement leafing agents.

Having fully described my invention and included in the description thereof specific performance trials explaining how the same is to be practiced, what I claim is:

1. The method of converting a non-leafing metallic aluminum base flake pigment comprising metallic aluminum base flake particles bearing an initial adherent relatively thin film coating of a non-leafing agent, to a leafing metallic aluminum base flake pigment in which the flake particles are characterized by a relatively thin adherent film coating of a leafing agent in total amount of 1 to 7 percent by weight of the flake particles, the steps comprising, selecting a quantity of the non-leafing metallic pigment aluminum base flake, preparing a slurry of the selected non-leafing pigment in a solution of volatile hydrocarbon solvent containing a straight chain higher saturated aliphatic acid leafing agent dissolved therein, heating the slurry above room temperature for a period of time sufficient to replace a substantial quantity of the non-leafing agent on the metallic aluminum base flakes with and from the leafing agent in solution in the slurry, cooling the slurry to room temperature, and separating the solid and liquid portions of the slurry to provide the leafing grade metallic aluminum base flake pigment.

2. The method of converting a non-leafing metallic aluminum base flake pigment comprising flake particles of aluminum base metal bearing an initial adherent relatively thin flake film coating of a non-leafing lubricant in total amount by weight of .35 to 3.5 percent of the weight of the metallic aluminum base flake pigment, to a leafing metallic aluminum base flake pigment comprising flake particles of the aluminum base metal and 1 to 7 percent by weight of the aluminum base metal flakes as an adherent relatively thin flake film coating of a leafing agent, the steps comprising, selecting a quantity of the non-leafing metallic aluminum base flake pigment, preparing a slurry of the selected non-leafing pigment in a solution of volatile hydrocarbon solvent containing a straight chain higher saturated aliphatic acid leafing agent dissolved therein, heating the slurry above room temperature up to the boiling point of the volatile hydrocarbon solvent for a period of time sufficient to replace the non-leafing agent on the metal flakes with and from the leafing agent in solution in the slurry, cooling the slurry to room temperature, and separating the solid and liquid portions of the slurry to provide leafing grade aluminum base metallic flake pigment.

3. The method of converting a non-leafing metallic aluminum base flake pigment comprising aluminum flake particles bearing an initial adherent relatively thin flake film coating of a non-leafing agent on the surfaces of the particles, to a leafing metallic aluminum base flake pigment bearing a replacement adherent relatively thin flake film coating of a leafing agent in total amount to 1 to 7 percent by weight of the flake particles on the surfaces thereof, the steps comprising selecting a quantity of the non-leafing metallic aluminum base flake pigment, preparing a slurry of the selected non-leafing pigment in a solution of volatile hydrocarbon solvent containing a straight chain higher saturated aliphatic acid leafing agent dissolved therein, heating the slurry above room temperature up to the boiling point of the volatile hydrocarbon solvent for a period of time sufficient to replace the non-leafing agent on the aluminum flakes with and from the leafing agent in solution in the slurry, cooling the slurry to room temperature, and separating the solid and liquid portions of the slurry to provide the aluminum base leafing grade metallic flake pigment.

4. The method of converting a non-leafing metallic aluminum base flake pigment comprising aluminum flake particles bearing an initial adherent relatively thin flake film coating of at least one unsaturated aliphatic acid non-leafing agent selected from the group consisting of lauric, oleic, linoleic and ricinoleic acids in total amount of .4 to 3 percent by weight of the aluminum flake particles, to a leafing metallic aluminum base flake pigment comprising aluminum flake particles having a relatively thin adherent flake film coating of at least one straight chain higher saturated aliphatic acid leafing agent selected from the group consisting of stearic, palmitic, 12-hydroxystearic and behenic acids in total amount of 1 to 7 percent by weight of the aluminum flake particles, the steps comprising, selecting a quantity of the non-leafing metallic aluminum base flake pigment, preparing a slurry of the selected non-leafing pigment in a solution of volatile hydrocarbon solvent containing a leafing agent dissolved therein, heating the slurry above room temperature up to the boiling point of the volatile hydrocarbon solvent for a period of time sufficient to replace the non-leafing agent on the aluminum flakes with and from the leafing agent in solution in the slurry, cooling the slurry to room temperature, and separating the solid and liquid portions of the slurry to provide the aluminum base leafing grade metallic flake pigment.

5. The method of converting a non-leafing metallic aluminum base flake pigment comprising aluminum flake particles bearing an initial adherent relatively thin flake film coating of at least one unsaturated aliphatic acid non-leafing agent selected from the group consisting of lauric, oleic, linoleic and ricinoleic acids in total amount of .4 to 3 percent by weight of the aluminum flake particles, to a leafing metallic aluminum base flake pigment comprising aluminum flake particles having a relatively thin adherent flake film coating of at least one straight chain higher saturated aliphatic acid leafing agent selected from the group consisting of stearic, palmitic, 12-hydroxystearic and behenic acids in total amount of 1 to 7 percent by weight of the aluminum flake particles, the steps comprising, selecting a quantity of the non-leafing metallic aluminum base flake pigment, preparing a slurry of the selected non-leafing pigment in a solution of volatile hydrocarbon solvent containing a leafing agent dissolved therein, heating the slurry to an elevated temperature between 60 to 180° C. for a period of time sufficient to replace the non-leafing agent on the aluminum flakes with and from the leafing agent in solution in the slurry, cooling the slurry to room temperature, and separating the solid and liquid portions of the slurry to provide the aluminum base leafing grade metallic flake pigment.

References Cited by the Examiner

UNITED STATES PATENTS 2,591,245  4/52  Edwards _____ 106—290

FOREIGN PATENTS 703,095  1/54  Great Britain.

TOBIAS E. LEVOW, *Primary Examiner.*

UNITED STATES PATENT OFFICE
CERTIFICATE OF CORRECTION

Patent No. 3,181,962                                   May 4, 1965

Rolf Rolles

It is hereby certified that error appears in the above numbered patent requiring correction and that the said Letters Patent should read as corrected below.

Column 4, lines 11 and 12, for "pigment aluminum base flake" read -- aluminum base flake pigment --; lines 44 and 45, for "aluminum base metallic" read -- metallic aluminum base --; same column 4, line 52, for "to", first occurrence, read -- of --; column 6, line 11, for "to", first occurrence, read -- and --.

Signed and sealed this 14th day of September 1965.

(SEAL)
Attest:

ERNEST W. SWIDER
Attesting Officer

EDWARD J. BRENNER
Commissioner of Patents